United States Patent [19]

Mahn

[11] 3,840,958

[45] Oct. 15, 1974

[54] CALENDER ROLLS

[75] Inventor: Hermann Mahn, Seelze, Germany

[73] Assignee: Herman Maschinenbau GmbH, Hannover-Kleefeld, Germany

[22] Filed: Aug. 7, 1973

[21] Appl. No.: 386,358

[30] Foreign Application Priority Data
Aug. 11, 1972  Germany............................ 2239550

[52] U.S. Cl. .......... 29/110, 29/116 AD, 29/113 AD
[51] Int. Cl. ............................................ B21b 13/02
[58] Field of Search ........ 29/110, 113 AD, 116 AD, 29/130, 113 R

[56] References Cited
UNITED STATES PATENTS

| 216,964 | 7/1879 | Lanham ................................ 29/110 |
| 242,058 | 5/1881 | Schurmann ................ 29/116 AD X |
| 271,605 | 2/1883 | Cooper ................................. 29/110 |
| 2,187,250 | 1/1940 | Sendzimir .......................... 29/110 X |
| 3,336,648 | 8/1967 | Alexeff ....................... 29/113 AD X |
| 3,522,643 | 8/1970 | Winkler ................................ 29/130 |
| 3,750,246 | 8/1973 | Pessen ............................ 29/116 AD |

*Primary Examiner*—Alfred R. Guest
*Attorney, Agent, or Firm*—Donald D. Jeffery

[57]  ABSTRACT

A calender roll for calendering material such as rubber, plastics or textile material to form a film web wherein, to compensate for deflection in operation of the roll in a calender due to pressure of material being worked in the roll-gap of the calender, the roll is of one-piece construction and has end portions of a length at each end of the roll equal to at least one-fifth of the length of the roll, so formed as to present an annular recess in each end face of the roll or so formed as to present a plurality of bores in each end face of the roll.

1 Claim, 15 Drawing Figures

CALENDER ROLLS

The invention relates to a calender roll for calendering rubber, plastics or textile material to form a film web.

Deflection of the roll caused by the relatively high forces occurring in the roll-gap, is a considerable problem in calendering, particularly in the manufacture of films of plastics material.

Barrelling of rollers, that is to say grinding of the rollers to give them a curvature along their lengths to offset deflection, has the disadvantage that the barrel curvature provided enables a film of uniform thickness over the entire width of web to be produced only in the case of one very specific set of loading conditions. Since the proportions of softening agent and filler of the material to be calendered and the desired thickness of the film may vary within wide limits, it is not possible with one set of barrelled rollers, without using additional means, to produce different kinds of films.

Although these difficulties can be overcome in part by means of a variable setting of the calendering rolls, the means for accomplishing this step are complicated and expensive.

A further possible way of offsetting deflection of the rolls and thus avoiding uneven thicknesses of film consists in imparting reverse deflection to the roll, also known as "roll-bending." In this method, a roll or two rolls forming a pair are pressed so firmly towards the roll-gap that the deflection caused by the forces in the gap that occur during operation of the calender are compensated, the pressure on the roll or rolls being achieved by clamping forces produced by means of hydraulic cylinders and applied to auxiliary bearings disposed outwardly of the roll bearings proper. Reverse deflection of the rolls, however, carries the disadvantage that the main roll bearings have to carry the reverse-deflection forces in addition to the forces in the roll-gap caused by calendering and this leads to considerable additional loading of the bearings and therefore to more rapid wear.

In the case of two cooperating calender rolls it generally happens that the rolls deflect when material passes between them, so that the gap between the rolls becomes somewhat larger at the middle portion than at the end portions. If the deformation resistance of the material is great and the diameter of the rolls is small in relation to their length, then deflection is considerable, and vice versa. The deflection that occurs is always very troublesome in all processes.

According to the invention there is provided a calender roll for calendering rubber, plastics or textile materials to form a film web, wherein the roll is of one piece construction, uniform outside diameter and has end portions, of a length at each end of the roll equal to at least one-fifth of the length of the roll, of reduced section thereby in operation to compensate for deflection of the roll caused by material being worked in the roll-gap of the calender.

Advantageously each of said end portions is of reduced section due to the provision of an annular recess in each end face of the roll. The annular recesses at the end faces of each roll can be resiliently sealed off and the recesses can optionally contain a substance having good heat-conducting properties.

Either one annular distance piece or a plurality of spaced distance pieces may be inserted in each annular recess for the purpose of controlling the angle of deflection of the roll.

Alternatively each of said end portions can be of reduced section due to the provision of bores in the end faces of the roll.

Preferably the diameter of each bore is reduced in a stepwise manner towards the middle portion of the roll and the length of each bore, apart from a first stepped portion thereof, is at least one-tenth of the length of the roll-shell.

A medium for heating the roll can with advantage be passed through the stepped bores.

Thus, when the core of the roll deflects as a result of the pressure of material in the roll-gap, which pressure occurs mainly in the middle portion of the roll, the tubular overhanging end portions of the roll-shell, resulting from the provision of annular recesses, are able to deflect to a greater extent, so that the thickness of the rolled film is uniform within tolerances of a few $\mu$.

When the roll is loaded, the deflection of the roll core is not transmitted to the shell of the roll, or is only partially transmitted thereto. The roll-shell transmits the load to the roll core. The two lateral ends of the roll-shell develop their own lines of curvature under load, and these lines run in a direction opposite to the line of curvature of the roll core. When the above-mentioned recesses are formed at the two ends of the roll body, it becomes possible, within the elastic deformation range of the roll core and roll shell, for the two deflections that occur to cancel each other out precisely, due to their occuring in opposite directions, so that a straight line along the shell is achieved irrespective of line pressure. The distribution of the wall-thickness of the roll-shell is suitably matched to the direction in which the line of bend extends.

In the case of an annular recess, an axially displaceable compressible ring of limited resilience can be fitted in order to enable an adjustment to be made to provide the ideal line of bend, by axially displacing the ring or by varying its compressibility.

If bores extending parallel to the axis of the rolls are used instead of an annular recess, webs of material from which the roll is formed remaining between the bores must alternately expand and be compressed elastically during each revolution and in accordance with the alternating rotary bending. The deflection can be accurately adjusted by means of annular parts which, when the adjustment is being carried out, can be pushed into the bore at the appropriate position and be secured in position.

The invention is diagrammatically illustrated by way of example in the accompanying drawings, in which:

FIG. 2b is a diagrammatic illustration, greatly exaggerated, of the deflection in use of the calendering roll of FIG. 2a;

FIG. 2d shows a cross-section of a film produced on a loaded roll comprising a portion c as shown in FIG. 2a;

Figure 1A:
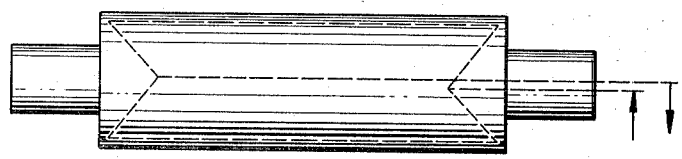
FIG. 1a shows a calender roll of known kind.
Figure 1B:
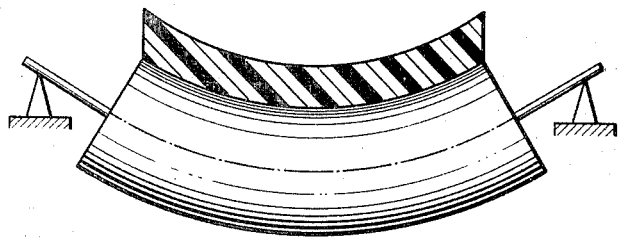
FIG. 1b is a diagrammatic illustration, greatly exaggerated, of the deflection and of the stretching load applied to the roll of FIG. 1a in use.
Figure 2A:
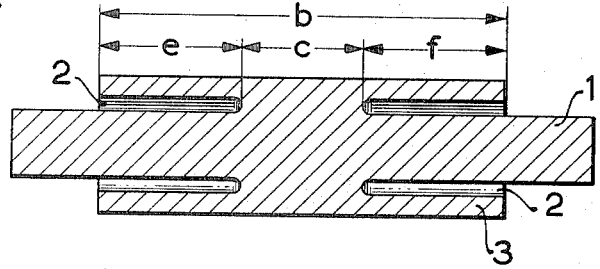
FIG. 2a shows a sectional view through a calendering roll according to the invention.
Figure 2B:
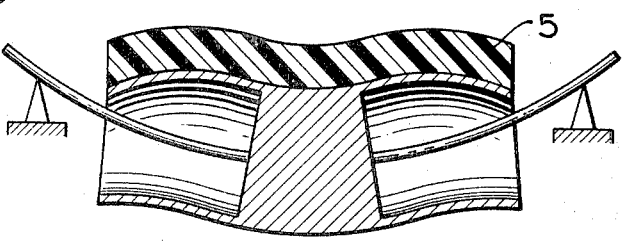
Figure 2C:
FIG. 2c shows the cross-section of a film produced by calendering with the roll of FIGS. 2a, 2b, in conjuction with a rectilinear roll.
Figure 2D:
Figure 2E:
Figure 2F:
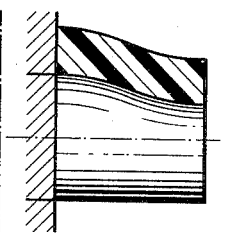
Figure 2G:
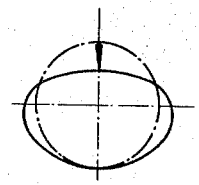
Figure 3A:
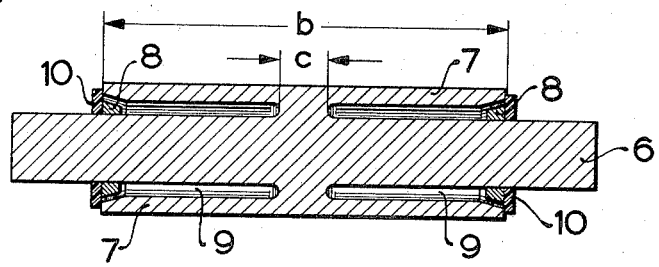
Figure 3B:
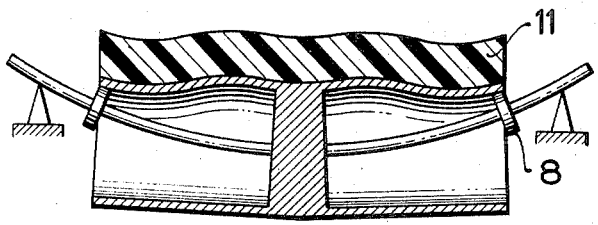
Figure 3C:
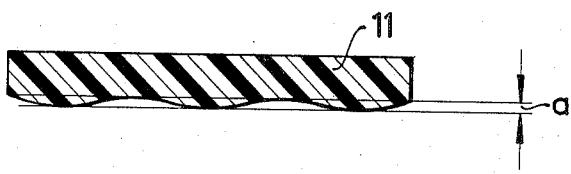
Figure 4A:
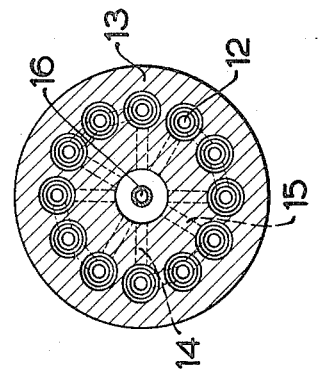
Figure 4:
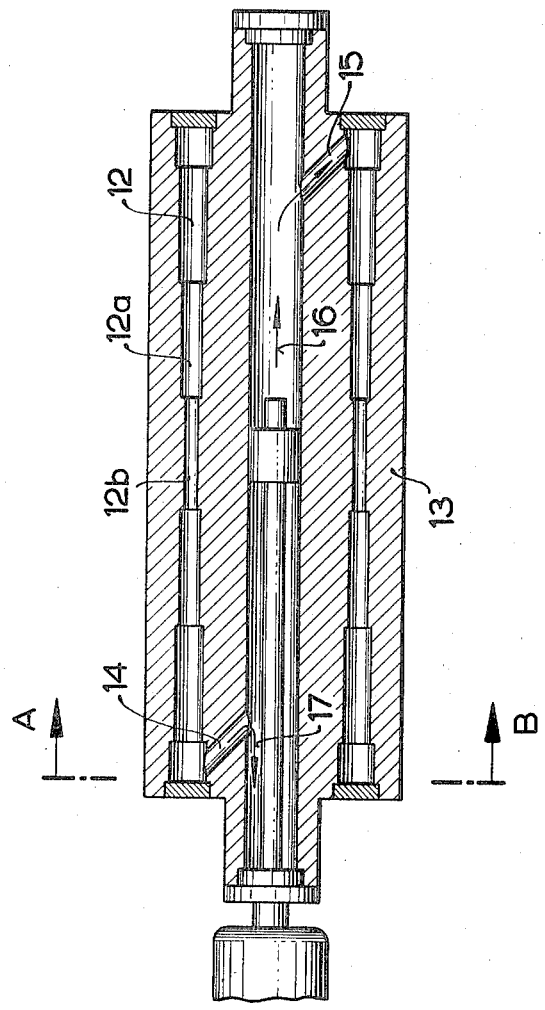

FIGS. 2e, f and g illustrate the deflection of the roll portions e and f of the roll of FIG. 2a, which deflection is governed by the following three factors:
i. the normal deflection shown in FIG. 1b,
ii. the deflection of the portions of the roll-shell that overhand the milled annular recesses e and f, and
iii. the compression of the tubular portions overhanging the annular recesses, which compression is shown in particular in FIG. 2g;

FIG. 3a shows a further form of construction of a calender roll according to the invention in which the middle part c of the roll is shorter compared with roll of FIG. 2a in order to reduce the deflection of that portion;

FIG. 3b is a diagrammatic illustration, greatly exaggerated, of the deflection and of the stretching load in use, of the calendering roll of FIG. 3a;

FIG. 3c shows the cross-section of a film produced by calendering with the roll of FIGS. 3a and 3b in configuration with a rectilinear roll;

FIG. 4 is a sectional view through a calendering roll according to the invention containing stepped bores; and FIG. 4a is a cross-section taken on line A–B of FIG. 4.

Referring to FIG. 2a, a one-piece roll 1 of uniform diameter has an annular recess 2 in each of its endfaces. The roll 1 is of effective length b and has a middle portion c and tubular overhanging parts of lengths e and f forming a roll-shell 3. The tubular overhanging parts are of such thickness that they undergo deformation in use under the forces occuring in the roll-gap, as shown in FIG. 2g. By deforming the overhanging parts in an appropriate manner a cros-section of film 5, as shown diagrammatically in FIGS. 2b and 2c, is obtained. The dimension a in FIG. 2c represents the thickness tolerance of the film so produced, which tolerance may amount to approximately 10 μ for a length of rollshell of approximately 2,000 mm.

FIG. 3a shows a calender roll 6 of effective length b wherein the length of the middle portion c of the onepiece roll 6 is shorter than that of the roll 1 of FIG. 2a. The annular recesses in the end faces of the roll-body are also milled out to a greater depth. In order to be able to control the deflection of tubular overhanging portions 7 thereby formed, an annular ring means 8 is inserted in each of the annular recesses 9, with a clearance being provided between the outer surface of the ring means and the adjacent surface of the recess. Alternatively, the ring means 8 can be replaced by a plurality of ring segments which are inserted at circumferentially spaced apart positions in the annular recesses 9. If the annular recesses 9 are filled with a liquid substance having good heat-conducting properties, resilient seals 10 are provided to prevent this liquid from escaping.

When a roll as shown in FIG. 3a is used, a crosssection of film as seen in FIG. 3b will be produced and if the counter-roll is rectilinear, a cross-section of film 11 as shown in FIG. 3c will be produced. The distance a seen in FIG. 3c again indicates the thickness tolerance which in this case too is in the order of 10 μ.

Referring to FIG. 4, the annular recesses are replaced by bores 12 in the end faces of the roll, the bores 12 extending parallel to the axis of the roll. The diameter of the bores 12 is reduced in a stepwise manner towards the middle zone of the roll. The different diameters of these bores 12, 12a and 12b enable the lines of bend of a roll-shell 13 and the roll core to be balanced out.

The required temperature is imparted to a roll as illustrated in FIGS. 4 and 4a by a previously proposed circulation method, in which a heating medium is introduced into the roll through a duct 16 extending along its axis. The cooling medium then passes through radially extending inclined bores 15 into the stepped bores 12 which are sealed at their outer ends and are interconnected by means of transverse bores, and leaves the roll through radially extending inclined bores 14 in the direction of arrow 17.

Figure 1C:
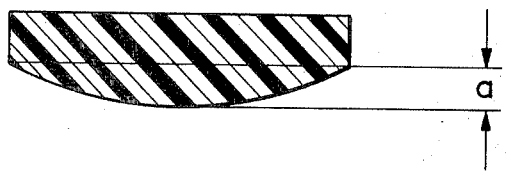
FIG. 1c shows the cross-section of a film produced by calendering with the roll of FIGS. 1a and 1b in conjunction with a rectilinear roll.

For the purpose of imparting the required temperature to the rolls of the form shown in FIGS. 1 to 3, peripheral bores of previously proposed kind are formed in the shell 3, 7 of the roll. In FIG. 1a, the circulation path is indicated by a broken line. It will of course be understood that hoses must be inserted into the inclined bores extending from the roll-body to the middle of the roll, which hoses are deformed in accordance with the load applied to the roll but nevertheless ensure that the heating ducts are fully sealed.

What is claimed is:
1. A calender roll for calendering material to form a film web, said roll being of one-piece construction and formed with annular recesses at each end thereof thereby forming tubular overhanging portions, said recesses being equal to at least one-fifth of the length of the roll, ring means inserted at the outer ends only of said recesses for controlling the deflection of said tubular overhanging portions, the outside dimension of said ring means relative to the inside surface of said recesses being such to provide a clearance therebetween when said roll is in an unloaded condition, a liquid substance having heat-conducting properties filling each of said annular recesses, and seal means disposed outwardly of said ring means for sealing off each annular recess.

* * * * *